Jan. 11, 1938.                S. A. PLATT                2,105,161
HANDLE FOR IMPLEMENTS, UTENSILS, AND THE LIKE
Filed March 10, 1936
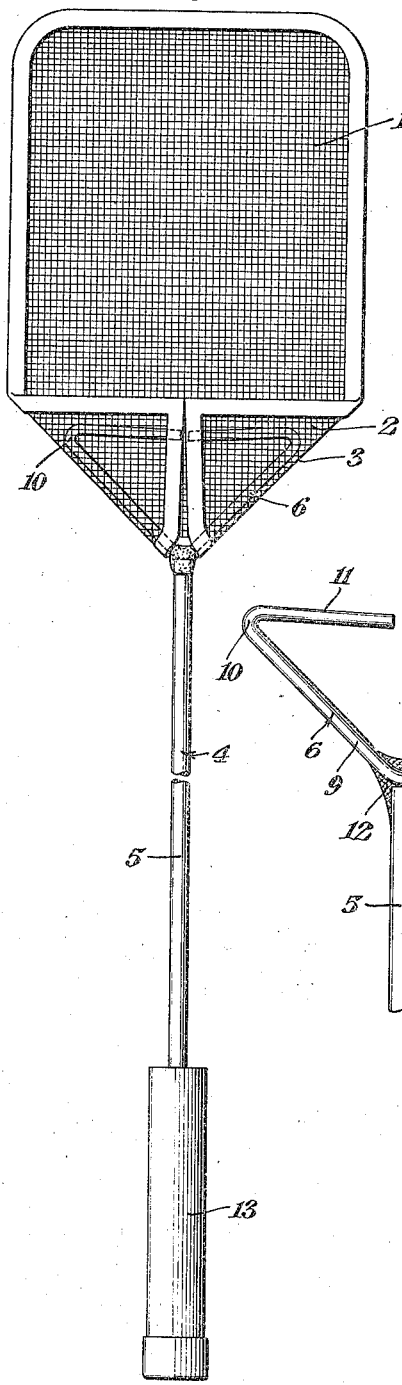
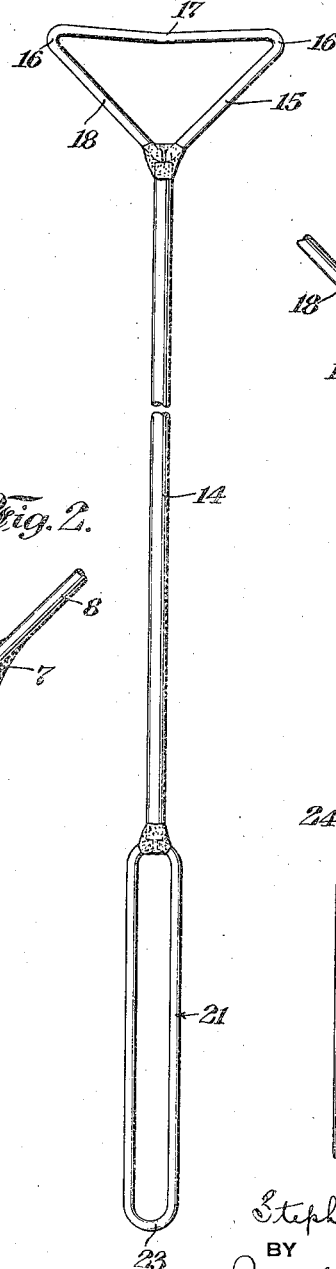
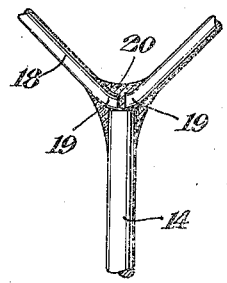
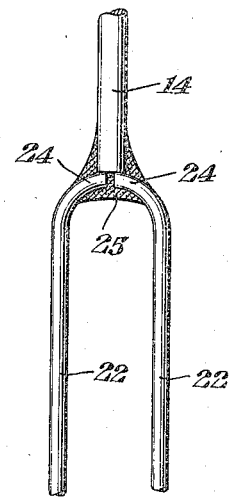
INVENTOR
Stephen A. Platt
BY
Prindle Bean & Mann
ATTORNEYS Patented Jan. 11, 1938

2,105,161

UNITED STATES PATENT OFFICE 2,105,161

HANDLE FOR IMPLEMENTS, UTENSILS, AND THE LIKE

Stephen A. Platt, Decatur, Ill., assignor to U. S. Manufacturing Corporation, Decatur, Ill., a corporation of Illinois Application March 10, 1936, Serial No. 68,019

1 Claim. (Cl. 16—110)

This invention relates to improvements in handles to be used with various forms of implements and utensils.

The principal object of this invention is the provision of such a handle which is simple and strong in construction, attractive in appearance, and which may be manufactured cheaply in quantity production.

To the accomplishment of the foregoing and such other objects as may hereinafter appear, this invention consists in the construction, combination and arrangement of parts hereinafter described and then sought to be defined in the appended claim, reference being had to the accompanying drawing forming a part hereof and which shows, merely for the purpose of illustrative disclosure, a preferred embodiment of my invention, it being expressly understood, however, that various changes may be made in practice within the scope of the claim without digressing from my inventive idea.

In the drawing—

Fig. 1 represents a side elevation of a fly swatter which is provided with one form of handle construction embodying my present invention.

Fig. 2 is a detailed view showing the joint between the triangular securing loop and the upper end of the handle member proper.

Fig. 3 is a side elevation of a handle member which is slightly modified in construction from that shown in Fig. 1.

Fig. 4 is a detailed view of the construction shown in Fig. 3 showing the connection between the upper end of the handle member proper and the securing loop.

Fig. 5 is a detailed view showing the connection between the lower end of the handle member and the gripping loop or element.

In Fig. 1 of the drawing I show a handle member which embodies my invention used in connection with a fly swatter, but it is to be understood that this invention is designed for and adapted to be used in connection with various other implements and utensils.

Referring first to Fig. 1 the numeral 1 designates a fly swatter body of standard construction which is of general rectangular shape having its lower corner portions 2 folded along lines 3 which converge to a point to form a triangular pocket in the lower portion of the fly swatter body.

The handle member proper is designated generally by the reference character 4 and includes the elongated handle element 5 which may be formed of a suitable length of wire or rod and to the upper end of which is connected a securing loop 6, which loop is of general triangular shape and adapted to be placed within the triangular pocket formed in the lower portion of the fly swatter body and to be secured therewithin by fastening means such as staples, stitching and the like. This triangular loop 6 is formed of one-piece of wire or rod and bent at 7 to form the apex of the triangle with the diverging sides 8 and 9 which are bent as at 10 to provide the horizontal legs 11 which are of sufficient length to meet or approximately meet near the middle of the device and thus form a substantially closed securing loop construction. This securing loop 6 is positioned upon the upper end of the handle element 5 with the apex 7 resting upon or in alinement with the end of element 5, and the triangular securing loop 6 is secured to the handle element 5 by welding, indicated at 12, or other suitable means, whereby a substantially integral structure is provided. The lower end of the handle element 5 is positioned within and secured to a suitable gripping element 13 by any one of various suitable means. This means forms no part of the present invention.

A somewhat different construction of handle member is illustrated in Figs. 3, 4, and 5. The handle element is designated by the reference character 14, the securing loop by the reference character 15. This securing loop is made in somewhat different fashion from the securing loop 6 illustrated in Figs. 1 and 2. The securing loop 15 is formed by bending a suitable length of wire or rod at the points 16 to provide a horizontal leg 17 and downwardly converging legs 18, the free ends 19 of which are slightly bent and brought into juxtaposition with each other and also the upper end of the handle element 14. At this point 20 the parts are connected together by welding or other suitable means, this weld serving to unite the two ends of the triangular loop together and also to the handle element 14 to provide a substantially integral and solid construction at the upper end of the handle member.

At the lower end of the handle element, a gripping member 21 is provided. This gripping member 21 is in the form of a single piece of wire or rod bent to provide parallel sides 22 which are connected at their lower end between closed loop 23 and upper free ends 24 which are bent inwardly toward each other and are positioned closely together and also in contact with or close to the lower end of the handle element 14, where at the place indicated by 25 the parts are all securely connected together by welding or other suitable means so as to constitute a substantial and strong construction and connection.

It is seen that in each instance I have provided a very simple form of handle construction in which a securing loop is provided, to which the implement such as a fly swatter may be readily and securely connected. If desired, the other end of the handle member may be provided with a separate gripping element or may be provided with loop gripping element which is welded or otherwise secured to the handle member.

The method of producing this article is quite simple, involving as it does the bending of the triangular securing loop, the bending of the gripping loop and the welding of these two loop members to opposite ends of an elongated handle element.

What I claim is:

A handle for implements, utensils, and the like, including, in combination, a handle element composed of a suitable single length of wire or rod, an open triangular securing loop composed of a single piece of wire or rod bent to form a horizontal leg and downwardly converging legs whose free ends are bent inwardly and brought into facing juxtaposition with each other to form the apex of the triangle, which apex is located adjacent the upper end of the handle element where the parts are secured together by means of a weld, and a looped gripping element composed of a single piece of wire bent to form a loop whose free ends are brought into facing juxtaposition with each other and secured to the lower end of said handle element by a weld.

STEPHEN A. PLATT.